(12) United States Patent
Chen et al.

(10) Patent No.: US 9,262,472 B2
(45) Date of Patent: Feb. 16, 2016

(54) CONCATENATION FOR RELATIONS

(75) Inventors: Qiming Chen, Cupertino, CA (US);
Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 62 days.

(21) Appl. No.: 13/456,384

(22) Filed: Apr. 26, 2012

(65) Prior Publication Data
US 2013/0290352 A1   Oct. 31, 2013

(51) Int. Cl.
*G06F 17/30* (2006.01)

(52) U.S. Cl.
CPC ................. *G06F 17/30389* (2013.01)

(58) Field of Classification Search
CPC .......... G06F 17/3595; G06F 17/30286; G06F 17/30595; G06F 17/30286
USPC ........................................................ 707/752
See application file for complete search history.

(56) References Cited

U.S. PATENT DOCUMENTS

| | | | |
|---|---|---|---|
| 5,446,886 A * | 8/1995 | Li | 707/714 |
| 5,613,142 A * | 3/1997 | Matsumoto | |
| 6,708,179 B1 * | 3/2004 | Arora | |
| 6,745,173 B1 * | 6/2004 | Amundsen | |
| 2003/0078913 A1 * | 4/2003 | McGreevy | 707/3 |
| 2009/0177621 A1 * | 7/2009 | Le et al. | 707/2 |
| 2009/0281985 A1 * | 11/2009 | Aggarwal | 707/2 |
| 2009/0319498 A1 | 12/2009 | Zabokritski et al. | |
| 2009/0319499 A1 | 12/2009 | Meijer et al. | |

OTHER PUBLICATIONS

Priti Mishra and Margaret H. Eich, Join Processing in Relational Databases, ACM Computer Surveys, vol. 24, No. 1, Mar. 1992, pp. 1-51 or (64-113).*
Liu, et al., "Efficient Relational Joins with Arithmetic Constraints on Multiple Attributes," research paper, Chicago IL.
Roussopoulos, N., et al. "A pipeline N-way join algorithm based on the 2-way semijoin program," 1991, IEEE Transections on Knowledge and Data Engineering vol. 3, iss. 4, Abstract.
Hsu, et al., "Generalized UDF for Analytics inside Database Engine," 2010, 11th International Conf. WAIM.
Chen, et al., "Extend UDF Technology for Integrated Analytics," 2009, Proc. 10th Int. Conf. on Data Warehousing and Knowledge Discovery, Austria.
"Query Optimization," Mar. 14, 2012, http://sourceforge.net/apps/mediawiki/bigdata/index.php?title=QueryOptimization.

* cited by examiner

*Primary Examiner* — Cam-Y Truong
(74) *Attorney, Agent, or Firm* — Hewlett Packard Enterprise Patent Department

(57) ABSTRACT

Methods for generating a query input string include sorting a first input relation and a second input relation in order from the first relation to the second relation. The second input relation is concatenated to the first input relation, and the concatenated input relations are stored in a single string.

10 Claims, 7 Drawing Sheets

CONCATENATION FOR RELATIONS

BACKGROUND

Pushing data-intensive computation down to a data management layer is one issue to fast data access and reduced data transfer. Integrating applications and data management have been attempted by, for example, running database programs including stored procedures on a server-side but outside a query engine, or performing computations through the use of user-defined functions (UDFs) executed in a query processing environment.

DETAILED DESCRIPTION

Figure 1:
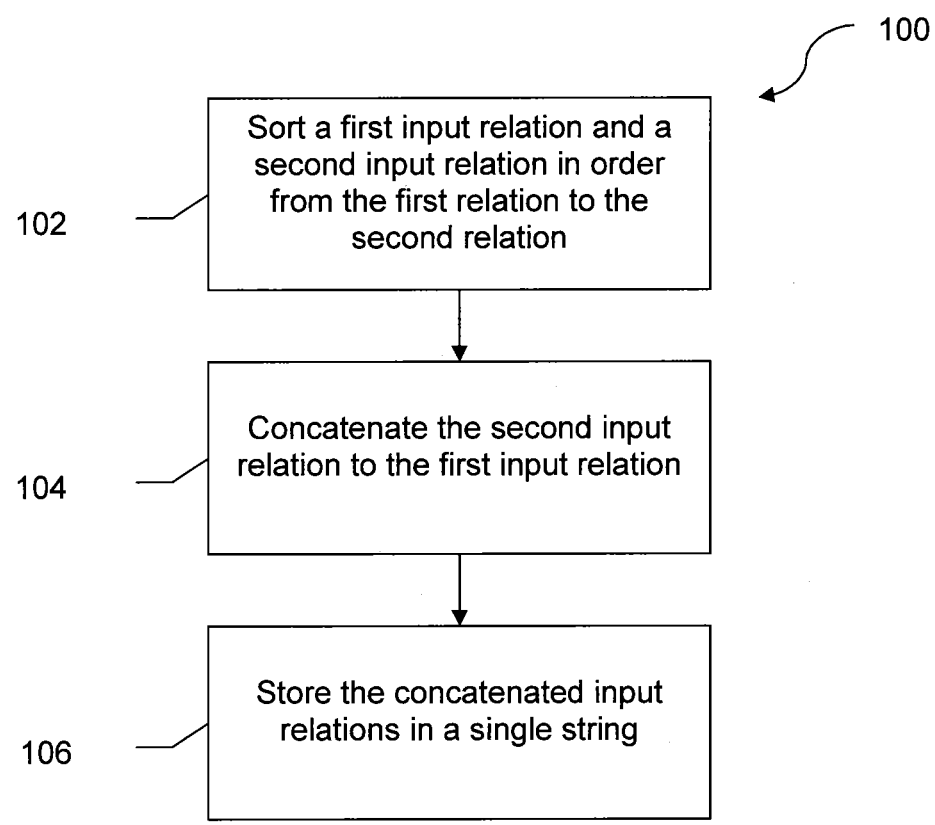
FIG. 1 is a flow chart diagram of a method according to one example of the present disclosure.

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, electrical or mechanical changes may be made without departing from the scope of the present disclosure. The following detailed description is, therefore, not to be taken in a limiting sense.

An input relation is a group of tuples, each tuple having common attributes. When two input relations each have tuples with the same common attributes, those input relations may be considered unionable. In query processing, when a query, for example a SQL query, has two input relations, it generates the Cartesian product of them. A Cartesian product is a joining of two or more input sets to form a new set. Each member of a Cartesian product set of two input sets, for example, is one of a set of all ordered pairs having a first component being a member of the first input set and a second component being a member of the second input set. With more input sets, the ordered pairs are identified as ordered tuples.

Therefore, a Cartesian product of an input set of M points and an input set of N points is a set having M×N entries. Such a Cartesian product contains all possible union results for the two input relations. Once the Cartesian product is generated, then each entry can be searched. Such a system of creating a union of two input relations can be processor intensive, as well as require very large buffers, and can also predicate issues with a swap file, all of which increase the amount of time such an operation takes, as well as the resources used, both physical and computational.

In many applications, it is desired to correlate two or more relations, but not in the form of their Cartesian product. It may not be necessary to use each of the Cartesian product lines in processing a query, and therefore, the large amount of buffer space, and the large number of calculations for a Cartesian product introduce unnecessary overhead. Overhead is proportional to the number of points, so it increases rapidly as the number of points increases. Further operations rely on computation of potentially very large Cartesian products.

For a class of operations that have two or more relations, such as input relations, having processing order dependency, that is, where one relation uses the other relation to make a determination of some sort, to calculate and use the Cartesian product means that every possible calculation is made. However, in instances in which processing order dependency of the two or more relations is present, the Cartesian product option can be excessive. For example, when operation on the second of the two or more input relations relies on the first relation, traditional queries re-load the first input relation each time it is to be used to make the determination. For example, in event processing, comparing a sequence of recent events (a first input relation) with a larger list of historic events (a second input relation) in which it is desired to place the recent event with the closest historic event, when performed with a Cartesian product, generates a list of all possible recent events with all possible historic events, which can be a very large list. The list comprises each recent event paired with each historic event, for a total list size of the number of recent events multiplies by the number of historic events. When processing order dependency is relevant, for example, when the recent events are to be fit into clusters of historic events, a Cartesian product can be very processor-intensive.

The present examples provide for concatenation of two or more input relations, allowing a wide range of operations with significantly reduced processor overhead. Appending a second relation to a first relation, with a tag identifying the first or the second relation generates ordered tuples of two or more input relations concatenated into a single string. This is useful when processing each point tuple of a first input relation, where information from another relation is used.

After two or more relations are concatenated, operation of a query on the concatenated relations allows reduction of processor overhead by, for example, allowing caching of a first relation of the concatenated relations for operation on a second relation of the concatenated relations. With a query that applies to two or more relations that are unionable, an execution method for the query that supports reading the two or more relations separately is provided. A rewinding of the query is performed so that, without shutting down the query, a second relation is processed.

FIG. 1 shows a method 100 of generating a query input string. Method 100 comprises, in one example, sorting a first input relation and a second input relation in order from the first relation to the second relation in block 102, concatenating the second input relation to the first input relation in block 104, and storing the concatenated input relations in a single string in block 106.

Sorting is accomplished in one example by sorting tuples of each of the first input relation and the second input relation. The tuples of the first input relation and the second input relation in another example each have a tag identifying of which input relation the tuple is a member, and sorting is accomplished by sorting the tuples according to the tags. Each tuple of the first input relation has a tag identifying it as a part of the first input relation, for example 0. Each tuple of the second input relation has a tag, different from the tag identifying the first input relation, for example 1. Each tuple of an input relation has the same tag. For more than two input relations, additional input relations are sorted, concatenated, and stored in order in the same manner as the first and second input relations.

Figure 2:
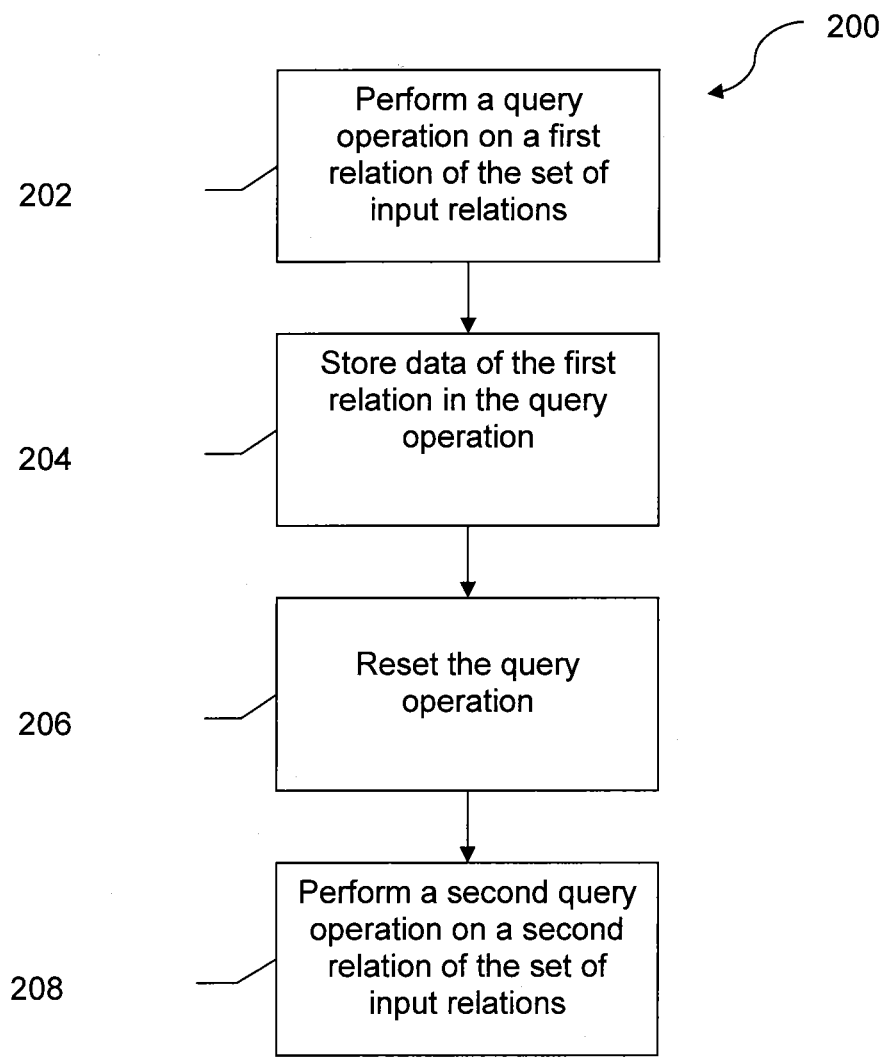
FIG. 2 is a flow chart diagram of a method according to another example of the present disclosure.

A method 200 of querying a concatenated set of input relations is shown in FIG. 2. Method 200 comprises, in one example, performing a query operation on a first relation of the set of input relations in block 202, storing data of the first relation in the query operation in block 204, resetting the query operation in block 206, and performing a second query operation on a second relation of the set of input relations in block 208.

Resetting the query operation is performed in one example without shutting down the query operation. When the query has read each tuple of the first input relation, which appear first in the query input string, the first input relation is closed, but the query instance is not shut down. Instead, the intermediate results of the first input relation, which have been cached, are discarded in the query instance, and the query rewinds to the start of the second input relation. The query is not re-parsed, re-planned, or re-initiated. Data of the first relation is stored, for example, in a cache or a buffer so that it is available for use by the query when a second query operation is performed on a second relation. Performing a second query operation on a second relation comprises in one example performing relation specific tasks on the second relation using stored data of the first relation. In some examples, a relation comprising an ordered set of tuples determined from the data of each of the first relation and the second relation is output.

Figure 3:
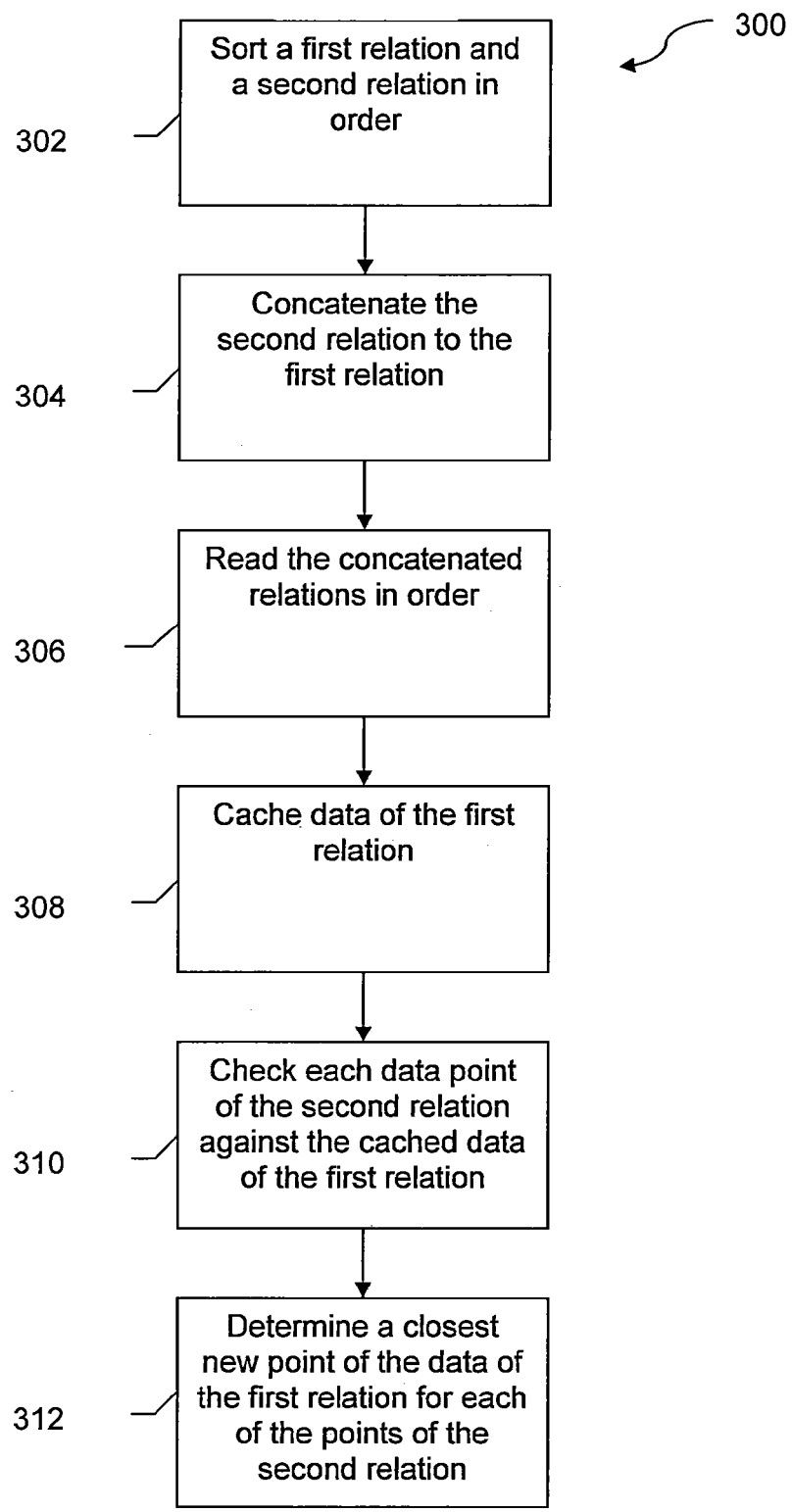
FIG. 3 is a flow chart diagram of a method according to yet another example of the present disclosure.

FIG. 3 shows a method 300 of operating a query. Method 300 comprises, in one example, sorting a first relation and a second relation in order in block 302, concatenating the second relation to the first relation in block 304, reading the concatenated relations in order in block 306, and caching data of the first relation in block 308, checking each data point of the second relation against the cached data of the first relation in block 310, and determining a closest new point of the data of the first relation for each of the points of the second relation in block 312.

Checking each point of the second relation data against the cached first relation data comprises in one example resetting the query to run on the second relation data once the first relation data is cached.

Sorting the first relation and the second relation is accomplished in one example by tagging each tuple of data in the first relation with a first tag identifying the tuple as a member of the first relation, tagging each tuple of data in the second relation with a second tag identifying the second relation tuple as a member of the second relation, and sorting tuple by tuple according to the tags.

Figure 4:
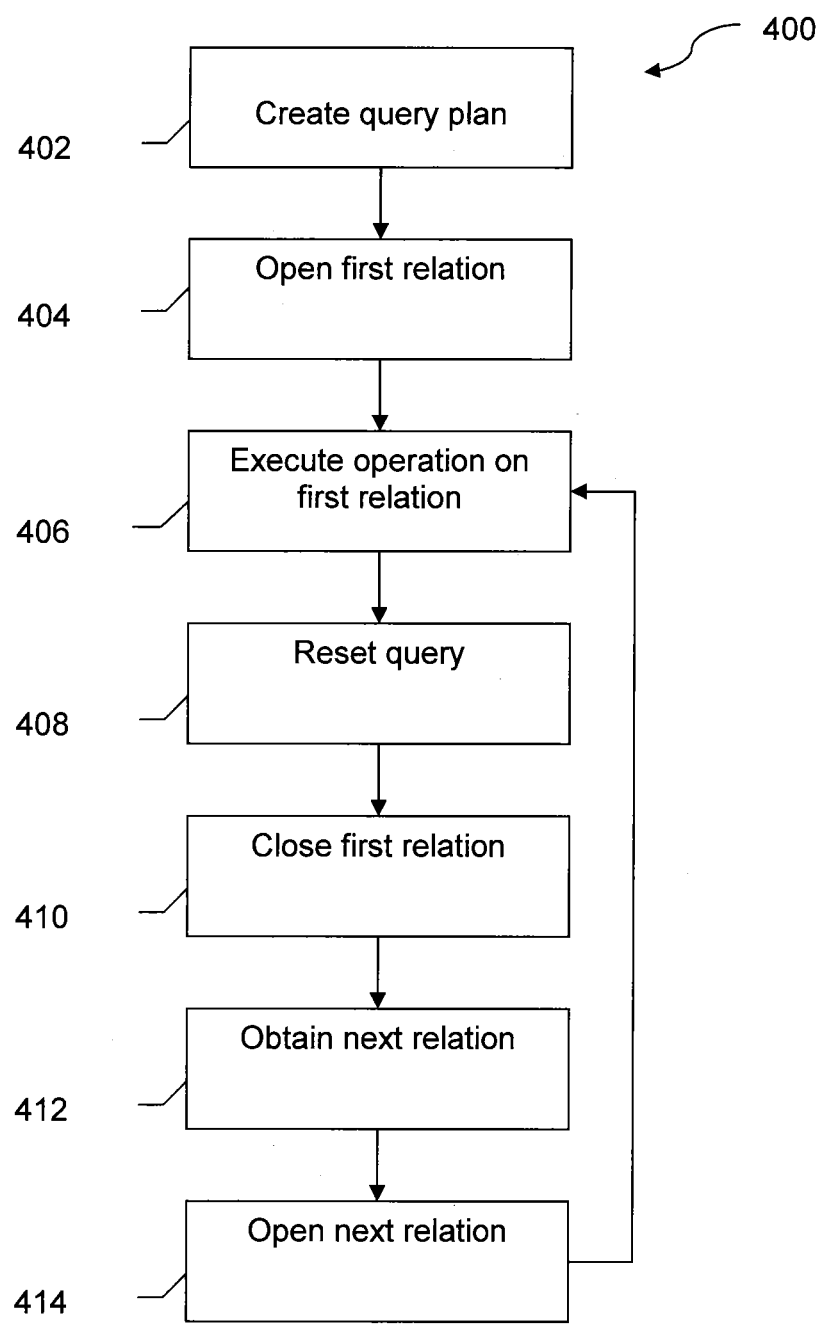
FIG. 4 is a flow chart diagram of a method according to another example of the present disclosure.

A method 400 of operation for an example of an append operator is shown in FIG. 4. In one example of method 400, a query plan is created in block 402. The query plan identifies the relations that are to be used in the method, such as a first relation and a second relation as discussed herein. The first relation is opened in block 404, and the query plan, that is, the operation that is to take place on the first relation, is executed in block 406. In the examples of the present disclosure, one operation on the first relation is the caching of the data of the first relation, although the operation is not limited to caching, and other operations may be performed without departing from the scope of the disclosure. Following operation of the query plan on the first relation in block 406, the query resets at block 408 so that the same query can be run again on a different relation. The first relation is closed at block 410, but the query remains open, and is not shut down. Once the reset is complete, the query plan is looked up to get the next relation ID at block 412, and the next relation is opened in block 414. Process flow continues at block 406 until all relations are read.

Once the first relation is read in the query, it may be cached or buffered, so that operations on the second relation may use the cached or buffered first relation without re-loading the first each time it is used. When the first relation is cached into a buffer or other cache, it is therefore available for operation when the second relation is opened.

An example of use of the methods described above is their use in k-means clustering. K-means clustering is used, for example, to cluster n objects into k partitions (or clusters), with k<n. Clustering is based on the objects' attributes which form a vector space. K-means clustering operates to reduce the total intra-cluster variance. It is an iterative process. Existing clusters are used as a point of reference. In each iteration, the nearest cluster center for each object to be assigned is identified, and the object is assigned as a member of that cluster. For each cluster center, its location (coordinate) is calculated to be the mean of the coordinates of its member objects, so when a series of new objects are assigned to clusters, the cluster center is recalculated. The process is repeated iteratively until the cluster centers converge. Processing of large sets of new objects (new centers) into an existing series of clusters defined by a large number of existing objects can be very cumbersome to process. For example, a single iteration of a k-means clustering computes distances to all centers of new objects and assigns each new object to its closest cluster center. Then, the cluster center locations are recalculated based on the average location of member objects.

In use, the implementation of the methods in a k-means cluster example is as follows. A pair of input relations are identified as centers (new objects) and points (old objects). The points are already assigned to a series of clusters, with each point having a point identifier and a location. Previously, assigning centers to clusters was performed by generating the full Cartesian product of the pair of input relations, followed by examination of each line of the Cartesian product to determine a closest. In the current implementation, the input relations are concatenated, with the centers first followed by the points. Each center has a center identifier (cid), and a coordinate (such as cx, cy), so that a center is identified as center (cid, cx, cy). Each center is then assigned a tag to distinguish it from points, so that a center is defined as center (tag, cid, cx, cy). Each point has a point identifier and a coordinate (such as x, y), so that a point is identified as point (pid, px, py). Each point is then assigned a tag to distinguish it from centers, so that a point is defined as point (tag, pid, px, py). The concatenation has the centers followed by the points in a single string that is input to a query.

Points are assigned to a series of clusters, with the cluster center of each cluster defined as a mean of the points assigned to the cluster. A user defined function for assigning centers operates as follows. For an iterative process, centers are in one example assigned certain coordinates. The assignment of coordinates is in one example an approximate coordinate pair for the center. For the first input relation in the concatenated string, the centers, which are first in the concatenated relation, are read and cached or buffered. Once all the centers are cached, the points, which follow the centers in the concatenated string, are read. For each point, the user defined function determines a nearest center to the point, and returns the cid of that center, the location of that point (e.g., (cid, px, py)). The output is therefore a series of tuples of point coordinates assigned to a particular cid. Since the first input relation is read and cached, it is retrieved once, and is therefore available for use in multiple point-to-point function calls, using the reset methods described herein.

That is one iteration of the k-means clustering operation. Based on the data output from the operation on the concatenated string, the cluster centers for the clusters are recalculated, in one example by calculating, by center, the mean of the coordinates for the points assigned to that center. The operation is repeated until the cluster centers converge.

Figure 5:
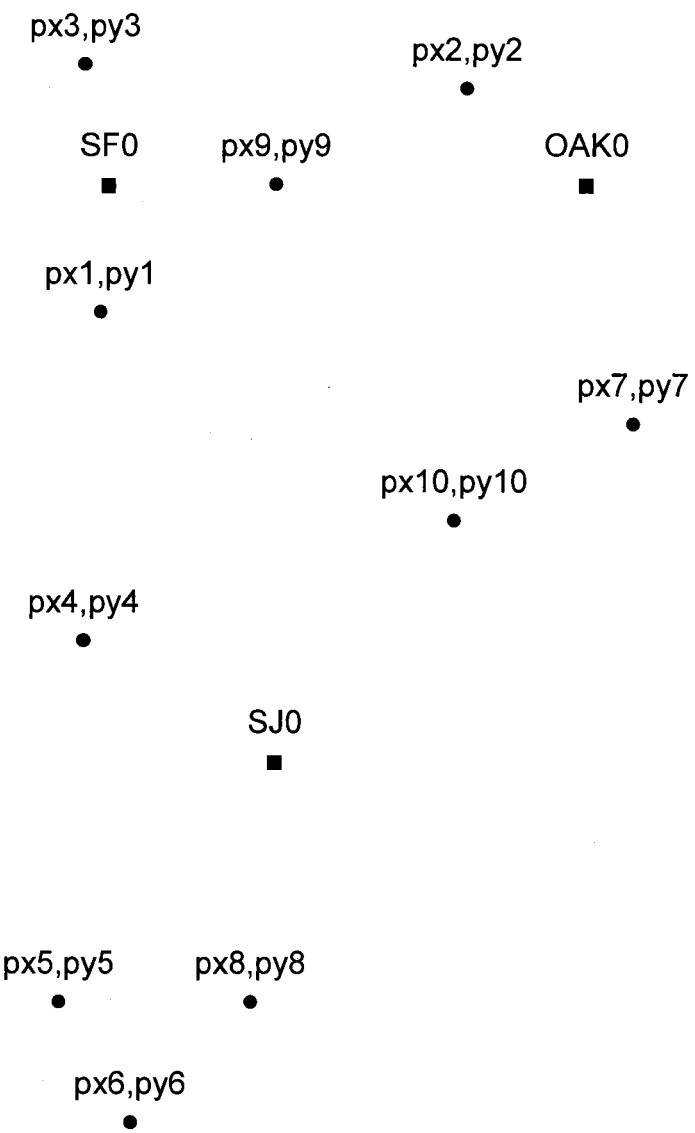
FIG. 5 is a diagram of a k-means clustering example of the present disclosure.
Figure 6:
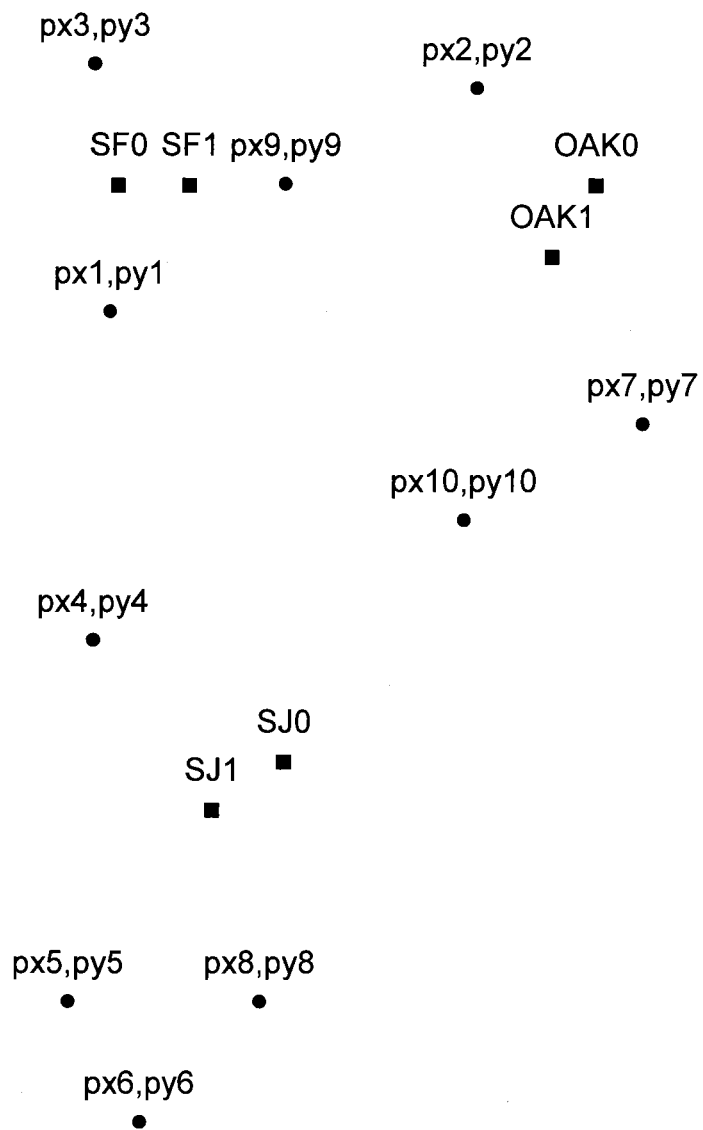
FIG. 6 is a diagram of a second iteration of the k-means clustering example of FIG. 5.

Another example of operation of the query process is shown with respect to FIGS. 5 and 6. In FIGS. 5 and 6, two input relations comprise a set of centers San Francisco (SF), Oakland (OAK), and San Jose (SJ) of a first input relation, each location having a tag 0, a center identifier (cid), and initial center location coordinates (cx,cy); and a set of existing geographic points of a second input relation, each point having a tag 1, a point identifier (pid) and location coordinates (px,py). They are defined as follows:
First input relation (tag, center identifier, locationx, locationy):
(0,SF,SFx0,Sfy0)(0,OAK,OAKx0,OAKy0)(0,SJ,SJx0,SJy0)
Second input relation (tag, point identifier, locationx, locationy):
(1,P1,px1,py1)(1,P2,px2,py2)(1,P3,px3,py3)(1,P4,px4,py4)
(1,P5,px5,py5)
(1,P6,px6,py6)(1,P7,px7,py7)(1,P8,px8,py8)(1,P9,px9,py9)
(1,P10,px10,py10)

The first input relation tuples, each having a tag of 0, are placed in a query input string before the second input relation tuples, each having a tag of 1. The order within the input relations does not matter, although the tuples may also be sorted within their respective input relation.

In a k-means clustering example, the initial centers SF, OAK, and SJ are read into a cache or buffer. Once the centers are read, the points are read individually, and each point is assigned to its nearest center. For the points of the second input relation of FIG. 5, the output of a first iteration is a relation comprising tuples of center ids and point locations as follows:
(SF,px1,py1)(OAK,px2,py2)(SF,px3,py3)(SJ,px4,py4)(SJ,px5,py5)(SJ,px6,py6)
(OAK,px7,py7)(SJ,px7,py7)(SF,px9,py9)(SJ,px10,py10)

The output is used to re-calculate center locations for centers SF, OAK, and SJ. Each new center location is the mean location of the points assigned to that center. That is, the new center location (SFx1,SFx2) for center SF is the mean of the coordinates (px1,py1)(px3,py3)(px9,py9), the new center location (OAKx1,OAKy1) for center OAK is the mean of the coordinates (px2,py2)(px7,py7), and the new center location (SJx1,SJy1) for center SJ is the mean of the coordinates (px4,py4)(px5,py5)(px6,py6)(px8,px8)(px10,py10). Therefore, a new first input relation to be used with the points is
(0,SF,SFx1,Sfy1)(0,OAK,OAKx1,OAKy1)(0,SJ,SJx1,SJy1)
The second input relation is the same set of points used above.

The locations of the newly calculated centers for SF, OAK, and SJ are shown as SF1, OAK1, and SJ1 in FIG. 6. The new first input relation centers SF, OAK, and SJ are read into a cache or buffer. Once the centers are read, the points are again read individually, and each point is again assigned to its nearest center. For the points of the second input relation of FIG. 6, the output of a second iteration is a relation comprising tuples of center ids and point locations as follows:
(SF,px1,py1)(OAK,px2,py2)(SF,px3,py3)(SJ,px4,py4)(SJ,px5,py5)(SJ,px6,py6)
(OAK,px7,py7)(SJ,px7,py7)(SF,px9,py9)(OAK,px10,py10)
In this iteration, the cid for point (P10,px10,py10) changed from SJ to OAK, as the new OAK center location is closer to the coordinates than the new SJ center location. Iteration of this type continues in one embodiment until the center location coordinates converge.

The k-means example described herein is just one implementation for the methods described in FIGS. 1-4, and other examples for use of the methods may be used without departing from the scope of the disclosure.

Implementations of FIGS. 1-4 of the present disclosure can be instantiated by machine-readable instructions, e.g., software, configured to cause a processor to perform methods disclosed herein. The machine-readable instructions can be stored on non-transitory computer-usable storage media in the form of volatile or non-volatile storage. Examples of storage media include solid-state memory (e.g., Read-Only Memory (ROM), Random-Access Memory (RAM), Flash memory, etc.); optical media (e.g., CD, DVD, Blu-Ray™ disks, etc.), magnetic media (e.g., magnetic disks and disk drives, magnetic tape, etc.). Such storage media may be a component part of a computer system, or it may include a removable storage medium.

Figure 7:
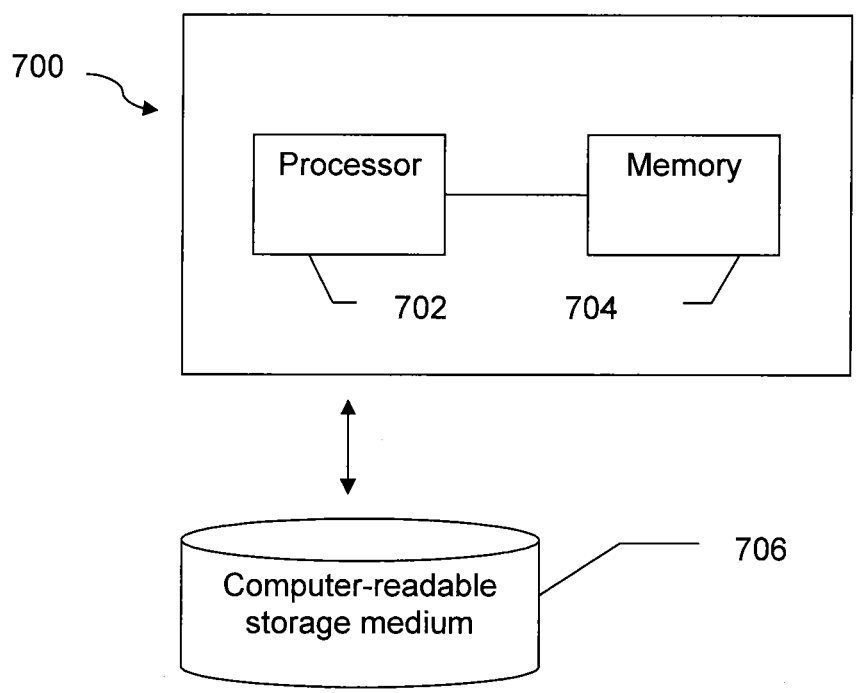
FIG. 7 is a block diagram of an example of a computer system for use with various implementations.

FIG. 7 is a block diagram of an example of a computer system 700 having a processor 702, memory 704 and a tangible storage media 706 in communication with the processor 702 for use with various implementations. The storage media 706 includes a non-transitory storage medium and has machine-readable instructions stored thereon configured to cause the processor 706 to perform methods disclosed herein.

Although specific examples have been illustrated and described herein it is manifestly intended that the scope of the claimed subject matter be limited only by the following claims and equivalents thereof.

What is claimed is:

1. A non-transitory computer-usable storage media having machine-readable instructions stored thereon to cause a processor to perform a method, the method comprising:
    generating a concatenated set of input relations, comprising:
        sorting each input relation of a set of input relations in order from a first input relation of the set of input relations to a last input relation of the set of input relations, wherein each input relation of the set of input relations comprises a group of tuples; and
        concatenating the input relations of the set of input relations such that all of the tuples of a second input relation of the set of input relations follow all of the tuples of the first input relation in the concatenated set of input relations, and all of the tuples of each subsequent input relation follow all of the tuples of all preceding input relations in the concatenated set of input relations; and
    querying the concatenated set of input relations, comprising:
        performing a query operation on the first input relation of the set of input relations;
        storing data of the first input relation in the query operation;
        resetting the query operation; and
        performing a second query operation on the second input relation of the set of input relations.

2. The non-transitory computer-usable storage media of claim 1, wherein the machine-readable instructions stored thereon further cause a processor to reset the query operation is performed without shutting down the query operation.

3. The non-transitory computer-usable storage media of claim 1, wherein the machine-readable instructions stored thereon further cause a processor to perform the second query operation on the second input relation by performing relation specific tasks on the second input relation using stored data of the first input relation.

4. The non-transitory computer-usable storage media of claim 3, the machine-readable instructions stored thereon further cause a processor to output an ordered set of data determined from the data of each of the first input relation and the second input relation.

5. The non-transitory computer-usable storage media of claim 1, wherein the machine-readable instructions stored thereon further cause a processor to store data of the first input relation in a buffer.

6. The non-transitory computer-usable storage media of claim 1, wherein the machine-readable instructions stored thereon further cause a processor to store data of the first input relation in a cache.

7. A system, comprising:
a processor;
a memory in communication with the processor; and
a non-transitory storage media in communication with the processor and the memory, the non-transitory storage media having machine-readable instructions stored thereon to cause the processor to perform a method of operating a query, the method comprising:
sorting a first relation and a second relation in order, wherein the first relation comprises a group of tuples and the second relation comprises a group of tuples;
concatenating the second relation to the first relation such that all of the tuples of the second relation follow all of the tuples of the first relation in the concatenated relations;
reading the concatenated relations in order, comprising reading all the tuples of the first relation then reading the tuples of the second relation;
caching data of the first relation;
checking each data point of the second relation against the cached data of the first relation; and
determining a closest new point of the data of the first relation for each of the points of the second relation.

8. The system of claim 7, wherein the machine-readable instructions stored on the non-transitory storage media further cause the processor to check each point of the second relation data against the cached first relation data by resetting the query to run on the second relation data when the first relation data is cached.

9. The system of claim 7, wherein the machine-readable instructions stored on the non-transitory storage media further cause the processor to sort the first relation and the second relation in order further by tagging each tuple of data in the first relation with a first tag identifying the tuple as a member of the first relation, tagging each tuple of data in the second relation with a second tag identifying the second relation tuple as a member of the second relation, and sorting tuple by tuple according to tags.

10. The system of claim 9, the machine-readable instructions stored on the non-transitory storage media further cause the processor to tag and sort additional input relations.

* * * * *